United States Patent
Driscoll

(10) Patent No.: US 8,170,949 B2
(45) Date of Patent: May 1, 2012

(54) PRODUCTS AND PROCESSES FOR ORDER DISTRIBUTION

(75) Inventor: James R. Driscoll, Chicago, IL (US)

(73) Assignee: BGC Partners, Inc., New York, NY (US)

( * ) Notice: Subject to any disclaimer, the term of this patent is extended or adjusted under 35 U.S.C. 154(b) by 764 days.

(21) Appl. No.: 12/189,266

(22) Filed: Aug. 11, 2008

(65) Prior Publication Data

US 2010/0036763 A1    Feb. 11, 2010

(51) Int. Cl.
*G06Q 40/00* (2006.01)
(52) U.S. Cl. ............................ 705/37; 705/35
(58) Field of Classification Search ............... 705/35, 705/37
See application file for complete search history.

(56) References Cited

U.S. PATENT DOCUMENTS

| | | | |
|---|---|---|---|
| 7,024,387 | B1 | 4/2006 | Nieboer et al. |
| 7,693,775 | B2 * | 4/2010 | Korhammer et al. ........... 705/37 |
| 7,899,749 | B1 * | 3/2011 | Studnitzer et al. .............. 705/40 |
| 2005/0234790 | A1 * | 10/2005 | Newport ......................... 705/35 |
| 2005/0240513 | A1 | 10/2005 | Merold |
| 2006/0136318 | A1 * | 6/2006 | Rafieyan et al. ................ 705/37 |
| 2006/0265309 | A1 | 11/2006 | Sweeting et al. |
| 2007/0118459 | A1 | 5/2007 | Bauerschmidt et al. |
| 2007/0233595 | A1 * | 10/2007 | Nordlicht et al. .............. 705/37 |

OTHER PUBLICATIONS

PCT Notification of Transmittal of the International Search Report and the Written Opinion of the International Searching Authority, or the Declaration for International Application No. PCT/US09/53361, 9 pages, Sep. 28, 2009.
Australian Exam Report for Application No. 2009282106, dated Jan. 24, 2012 (2 pages).

* cited by examiner

*Primary Examiner* — Jagdish Patel
(74) *Attorney, Agent, or Firm* — Mark A. Miller

(57) ABSTRACT

Systems and methods for trading financial instruments through multiple trading intermediaries are described.

28 Claims, 3 Drawing Sheets

PRODUCTS AND PROCESSES FOR ORDER DISTRIBUTION

BACKGROUND (1) Field

Some embodiments may relate to trading of financial instruments.

(2) Related art

Financial exchanges allow participants to buy and sell financial instruments from other participants. Various methods may be used by such exchanges to determine matching of orders and facilitate execution of trades.

SUMMARY

Some embodiments may include a method comprising: receiving, by a computing device from a trading system, a computer message identifying a first order, in which the first order includes an instrument to be traded, a quantity of the instrument to be traded, and a side of a trade for the instrument; receiving, by the computing device, an indication of a rate at which orders for the side of the trade for the financial instrument are expected to be fulfilled by at least one first exchange of a plurality of exchanges; receiving, by the computing device, an indication of at least one quantity, in which each quantity of the at least one quantity includes a total of quantities associated with at least one respective second order pending on at least one second exchange of the plurality of exchanges, in which the second orders include the instrument and the side of trades for the instrument; receiving, by the computing device, an indication of a method used by at least one third exchange of the plurality of exchanges to fulfill orders pending on the exchange when matching orders received by the third exchange; based at least in part on the rate, the at least one quantity, and the method, computing, by the computing device, a distribution of sub-parts of the first order among the plurality of exchanges; and attempting, by the computing device, to facilitate execution of the first order on the plurality of exchanges according to the distribution of sub-parts to the plurality of exchanges. Other example embodiments are described as well.

DETAILED DESCRIPTION

Figure 1:
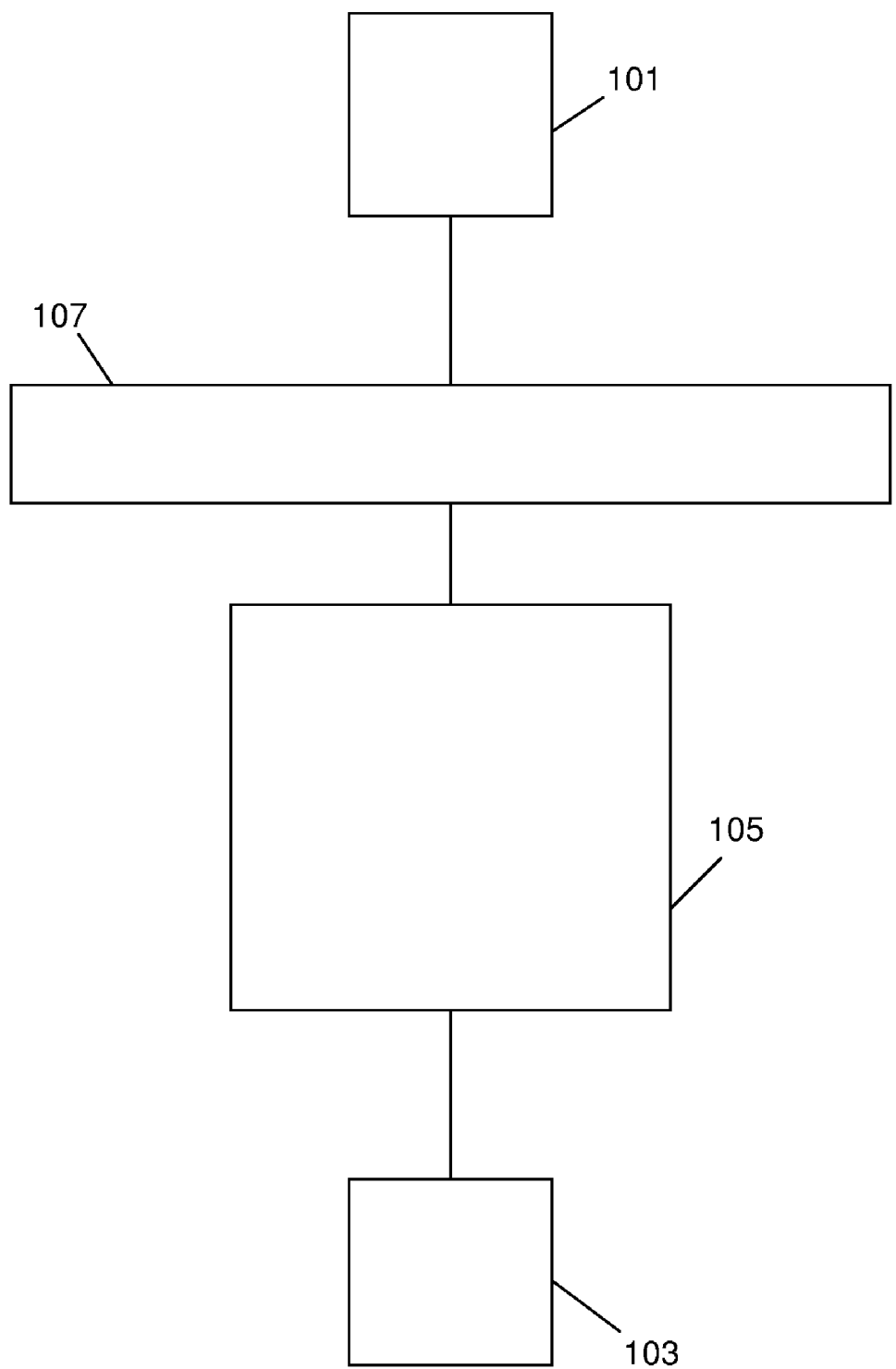
FIG. 1 illustrates an example system for trading financial instruments.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms Of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples And Terminology Are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Embodiments

Various embodiments relate to systems and/or methods for the trading of one or more types of financial instruments (e.g. bonds, bond futures contracts, interest rate swaps, other securities, stock options, commodities, equities, currencies, derivatives of any of the foregoing, etc.). U.S. patent application Ser. No. 12/014,027 to Lutnick, filed Jan. 14, 2008, which is hereby incorporated herein by reference, discusses some example systems and methods related to such trading. The Chicago Mercantile Exchange is an example exchange that operates to facilitate the trading of such financial instruments.

FIG. 1 shows a diagram of an example trading system. The trading of financial instruments typically involves two sides (i.e., a buyer 101, and a seller 103) and a least one intermediary (e.g., an exchange 105 such as the Chicago Mercantile Exchange, broker 107, and so on). In the example of FIG. 1, a buyer 101 of a first financial instrument may identify his desire to buy the first financial instrument to a broker 107. The broker 107 may transmit an order to buy the first financial instrument to the exchange 105.

The exchange 105 may include one or more computer systems configured to facilitate the trading of financial instruments. In some implementations, an exchange may include one or more computer systems configured to receive indications of orders, determine if any of the indicated orders match, and facilitate execution of at least some of the matching orders. The exchange 105 may store information related to the order to buy, may verify the information, may authenticate the buyer 101, may authenticate the broker 107, may publish information about the order to buy, and/or may take any other desired actions. The exchange 105 may determine if a matching sell order for the same financial instrument has been submitted to the exchange 105. Orders may match if they are for opposite sides of a trade for a same financial instrument, orders may match if they are for opposite sides of a trade for a similar financial instrument, orders may match if they are for a same price, orders may match if they are for an overlapping price range, orders may match if they use a same pricing method, orders may match if they are for a similar quantity, orders may match if they are for the same quantity, orders may match if they are for an overlapping quantity range, and/or any other information may be used to determine if orders match in various implementations.

If no such matching order has been submitted, the exchange may store information identifying the buy order in case a matching sell order is received in the future. In this example, a seller 103 may submit a sell order for the financial instrument at some future time. The exchange 105 may then facilitate execution of a trade that fulfills at least a portion of each of the buy and sell orders. It should be recognized that the use of a broker 107 and the sides of a trade are given as examples only and that other embodiments may include other arrangements.

In some embodiments, a trade involving a quantity of financial instruments may be facilitated at a price. In some embodiments, the information submitted by the buyer and/or the seller may identify the price and/or a price range in which the buyer and/or the seller may be willing to trade. The trade may be facilitated if the prices are the same or the price ranges overlap. The trade may be performed at an identified price and/or according to some pricing method. In some embodiments, such a pricing method may include midpoint pricing, volume weighted average pricing, pricing based on a most recently traded price on an exchange, and so on. In some embodiments, the price and/or pricing method may be determined through a negotiation between the buyer and the seller and/or may be set by an exchange through which an exchange is facilitated. Any other method may be used to determine the price.

The quantity of the financial instruments that may be exchanged may be identified by information submitted by the buyer and/or the seller. In some instances the quantity may be the same for both the buyer and the seller submitted information. If the quantity is the same, in some implementations, the quantity exchanged at the price may include the quantity identified by both the buyer and the seller. In other implementations, the identified quantities may be different for each of the buyer and the seller. If the quantity is different, the quantity exchanged at the price may be one of the two quantities and/or some other quantity. For example, in one implementation, the quantity may be the lower of the two quantities. In some implementations, a negotiation may take place between the buyer and the seller to determine the quantity.

In some embodiments, facilitating a trade may include one or more actions that help to bring about execution of a trade. Facilitating a trade may be referred to similarly to facilitating execution of an order and similar terms. Facilitating execution may include, for example, placing a plurality of orders on one of the plurality of exchanges. Such placement may take place according to a distribution as described below. Execution of a trade may include an exchange of a financial instrument for some other thing (e.g., money, another financial instrument, credit, etc.). Some examples of facilitation of a trade may include: forwarding information about the trade to a clearing house, performing the execution of the trade, transferring a financial instrument from one person to another person, and so on.

In some embodiments, parties to a trade may negotiate about one or more terms related to a trade. For example, parties may negotiation about price of a trade, quantity of financial instruments to be traded, a time for execution of the trade, a method of execution of a trade, a provider of execution related service for a trade, and so on. Negotiation may take place electronically (e.g., through computer interfaces such as instant messaging interfaces, email interfaces, and so on) in person, over the telephone, and so on.

Information received about a desired trade may be referred to as an order. An order may include, for example, any information that identifies a desire for a trade of one or more financial instruments. The order may be formatted according to a specific format desired by a trading intermediary (e.g., an XML formatted electronic message, a FIX message, etc.). An order may include a buy order, a sell order, a short order, a swap order, a market order, and/or any other type of order. An order may identify a time period to stay valid (e.g., until end of trading for a day, for an hour, fill immediately or cancel, and so on). An order may identify a price, pricing method, and/or quantity.

One or more interfaces may be used in some embodiments to interact with a trading intermediary (e.g., by a buyer and/or seller to submit information about an order). For example, in one embodiment, an interface may allow a person to enter information about a desire to trade a financial instrument and submit the information to an exchange. Information about such submitted information may be displayed through the interface to the person. It should be understood that in some embodiments people may submit trade information (e.g., over the phone, into a computer, etc.) and/or computers may submit such information (e.g., algorithmic trading systems, order management systems, trading interfaces, etc.).

It should be recognized that the above description illustrates a trading example of some embodiments in which a single seller and buyer interact through an intermediary. It should be recognized that other embodiments are not so limited and that, as described below, various embodiments, may include any number of trading intermediaries, any umber of buyers, any number of sellers, and/or any number of actions and/or apparatus.

In some embodiments, for example, an exchange may receive indications to buy more of a quantity of financial instrument than to sell (or the opposite). For example, buyers of a financial instrument may submit orders totaling requests to buy 10,000 shares to an exchange. The same exchange may have no sellers submit orders to sell the financial instrument. In other embodiments, seller orders may be submitted, but may be associated with prices that do not match the buyer orders. If a first seller submits a sell order that matches the buy orders, the exchange may use some distribution method to distribute the quantity of financial instruments from the seller order among the buyer order. If the quantity associated with the sell order is equal to or greater than the quantity of the sum of the buy orders, then all buy orders may be fulfilled. Otherwise, some distribution method may be used to determine which orders are fulfilled.

In various embodiments, an exchange may use any distribution algorithm. In some embodiments, for example, a FIFO (first in first out) algorithm may be used. In a FIFO algorithm, the first order submitted is matched with the next incoming matching order. So, for example, the sell order in the example above would be first matched with which ever buy order was submitted to the exchange first. If the sell order has a quantity greater than that first buy order, then the second submitted buy order may also be matched, and so on until the sell order is completely fulfilled.

Another example algorithm includes a pro-rata algorithm. In a pro-rata algorithm, multiple pending orders for a side of a trade may each be partially fulfilled when a matching order is submitted. The orders may be matched in proportion to the quantity of the financial instrument associated with the order for an equal amount, and/or in any other way. For example, in a simple equal fill pro-rata algorithm, each of the buy orders might receive an equal number of financial instruments from the sell order until the buy order is fulfilled. This may not fulfill any one of the buy orders completely but may fulfill all of them partially.

Some implementations may include an exchange that uses an at least partially pro-rata method. Such a method may include a pro-rata method with business logic elements, a hybrid pro-rata and FIFO method, and/or any other method that uses pro-rata elements.

Some embodiments may include a business logic element in a distribution method. A business logic element may make a method work to the liking of an exchange operator or customers of an exchange by taking into account various characteristics of an order, a trader, and/or a situation in determining how to fill pending orders. Such business logic elements may be part of a FIFO or pro-rata method, thereby adjusting the method from a pure FIFO or pro-rata algorithm to a hybrid method. For example, in some embodiments, if an amount of an order that is less than a threshold would be left unfulfilled using a pro-rata method, a business logic element may adjust the pro-rata fill method so that the order is fulfilled and the other orders are less fulfilled. As another example, if an order in a FIFO algorithm is large, that order may get priority over earlier submitted orders that are smaller, and so on. Some example business logic elements may include, for example, giving priority to large orders, filling small portions of an order to complete an order, ignoring small orders if larger orders are pending, favoring some customers over other customers (e.g., high volume customers over low volume customers), fulfilling orders that have been pending for some time over other orders, and so on.

In one example, an exchange uses a pro-rata method that fulfills orders in proportion to a quantity associated with the orders and does not leave orders for one financial instrument pending. In such an exchange, two buy orders for a financial instrument may be pending, the first order for 100 and the second order for 200. If a sell order for the financial instrument arrives, for 297 of the same financial instrument, the exchange may initiate a trade as follows: the order for 100 may be filled to 99 and the order for 200 may be filled to 197. The additional one sale may be given to the 100 order so that a partially fulfilled order for 1 instrument is not left pending, leaving only a buy order for 3 of the financial instruments pending in the exchange.

It should be recognized that any fulfillment method may be used in any embodiments and that although some embodiments may focus on pro-rata algorithms, those embodiments are given as non-limiting examples only.

It is recognized that in some embodiments, multiple exchanges may be available for the placement of orders for a single financial instrument. For example, the CMT and the ELX exchanges may both allow trading of futures contracts, options contracts, and/or any other type of financial instruments. Each exchange may have a same or different method for fulfilling orders. It is recognized that in some embodiments, orders may be submitted to multiple exchange in a way that may increase an expected speed and/or probability of fulfilling the orders. Such submission of orders may take into account the method for fulfilling orders, may estimate the methods for fulfilling orders, may take into account historic fillings of orders, may take into account historic submissions of orders, and/or may take into account any other information. In some embodiments, such submission of orders may take place through a market intermediary (e.g., a broker, using a FIX messaging protocol, etc.). In some implementations, such a market intermediary may include a computers system through which orders may be submitted. Such a market intermediary may have access to the one or more exchanges and may submit portions of an order to the one or more exchanges in a way that may increase an expected speed and/or probability of order fulfillment compared to a submission of the complete order to either one of the multiple exchanges.

Figure 2:
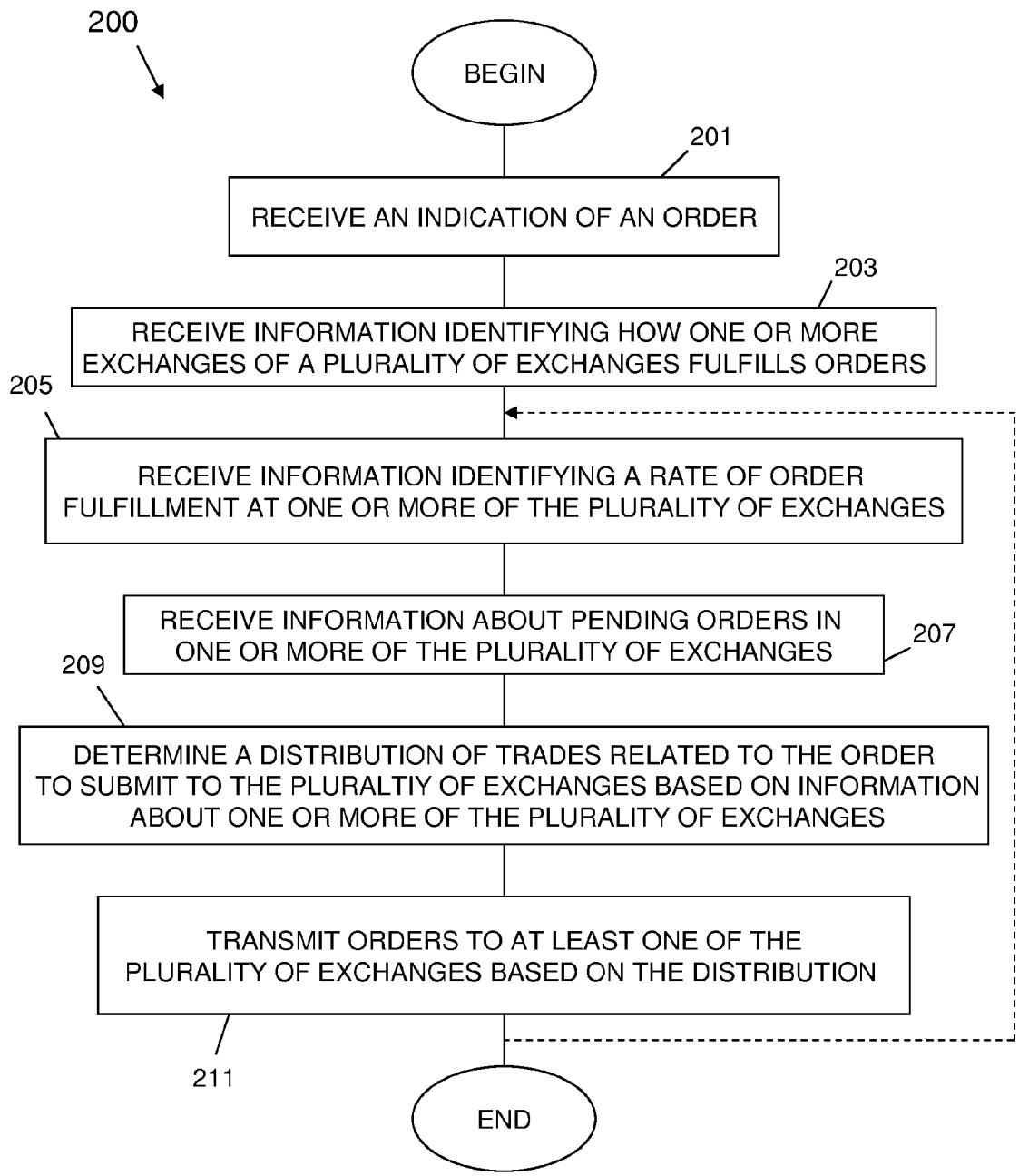
FIG. 2 illustrates an example method that may be performed by some embodiments.

FIG. 2 illustrates an example method 200 that may be performed to submit an order to multiple exchanges in some embodiments. Method 200 may be performed, for example, by a market intermediary, such as a broker, a computer system coupled to multiple exchanges, and so on. Method 200 may be performed by a trading computer used by a trading institution, such as a hedge fund and so on. It should be recognized that method 200 is given as an example only and that other embodiments may include different methods, different actions, additional actions, alternative actions, and so on.

As indicated at block 201, method 200 may include receiving an indication of an order. The order may be an order to buy and/or sell one or more financial instruments. The indication may be received from a person, a computer system, a market intermediary, a broker, a principal to the trade, and/or any other entity. The indication may be received over a communication network, over a telephone, as one or more packets over an electronic network, as a FIX message, and/or in any other way. The indication may include an identification of a side of a trade for a financial instrument. The indication may include a quantity and/or quantity range for the trade. The indication may include a price, price range, pricing method and/or any other information about a price for the trade.

As indicated at block 203, method 200 may include receiving information about how one or more exchanges of a plurality of exchanges fulfill orders. One exchange may, for example, fulfill orders according to a pro-rata method, another exchange, for example, may fulfill orders according to a FIFO method, and so on. The one or more exchanges may use any method for fulfilling orders in any combination. The information may be received, for example, from the exchange (e.g., as an electronic message from the exchange that describes how the exchange fulfills orders, etc.), from a regulatory agency (e.g., the SEC, FINRA, as a description of how an exchange fulfills orders, etc.), from a publication about the exchange (e.g., a website, a regulatory publication, an advertisement, etc.), from a historical analysis of how trades have been fulfilled in the passed, from a source of historic trading information, and so on. In some embodiments, such a historical analysis may be performed as part of a method (e.g., publically disclosed information about fulfilled trades that have taken place in the past may be analyzed to determine how those orders were fulfilled). It should be recognized that the information may or may not fully identify the method of fulfilling orders. For example, a the information may identify some but not all business logic used to determine how orders are fulfilled, may identify all the business logic about how orders are fulfilled, may identify none of the business logic of how the orders are fulfilled, and so on. The information may include any information from which some or all of a method of fulfilling orders may be determined (e.g., a description of the method, order fulfillment history, etc.). It should also be recognized that exchanges may change some or all of the methods of fulfilling orders from time to time and some embodiments may receive updated information (e.g., from time to time, continuously, after a period after the change takes place, and so on) while others may not.

As indicated at block 205, method 200 may include receiving information about a rate of order fulfillment at one or more of the plurality of exchanges. The information may, for example, include a history of order fulfillment (e.g., a speed at which orders have been fulfilled in the past, a speed at which orders have been fulfilled in similar circumstances, and so on). An expected rate of order fulfillment may be determined from such historic information. A third party may identify an expected rate of order fulfillment. The rate of order fulfillment may identify an expected time before a next order having an opposite side of the order may arrive, an expected amount of orders per time period that may arrive, and/or any other information related to speed of incoming orders or from which such information can be derived.

As indicated at block 207, method 200 may include receiving information about pending orders in one or more of a plurality of exchanges. The pending orders may include orders for a same side of a trade for the financial instrument and/or information about orders for the opposite side of a trade for the financial instrument. Such information may be received, for example, from published information provided by the exchanges (e.g., a book of trades available), third party information providers, estimated based on historic information and/or received from any other source and/or determined in any other way.

As indicated at block 209, method 200 may include determining a distribution of orders for the plurality of exchanges to fulfill the order (i.e., from block 201). In some implementations, the distribution of orders may be determined to provide an expected speed of fulfilling the order that is greater than if the order were submitted in full to one of the plurality of exchanges and/or a greater probability of fulfilling the order in a time period that if the order were submitted in full to one of the plurality of exchanges. In some embodiments, the distribution may be based on the methods of fulfilling orders for some or all of the plurality of exchanges, the orders pending on some or all of the plurality of exchanges, the rate of order fulfillment for one or all of the plurality of exchanges, and/or any other information.

In one example embodiment, two exchanges may fulfill orders in a pro-rata fashion and a distribution of orders may be determined one time for the received order. As discussed later, some embodiments may determine new distributions based on changing conditions of an exchange; however, such new distributions may not be determined in all embodiments.

In this example embodiment, a first exchange may have an expected rate of orders being fulfilled equal to V1 and a second exchange may have an expected rate of orders being fulfilled of V2. The first exchange may have pending orders on the same side of the trade as the order for a quantity of instruments equal to X1 and orders on the opposite side for a quantity of instruments equal to Y1. The second exchange may have orders pending on the same side of the order for a quantity of instruments equal to X2 and on the opposite side of the trade for a quantity of instruments equal to Y2.

In one implementation, a distribution may be determined by determining a first amount to distribute based pending orders. For example, the exchange with a lower value of (X−Y)/V may be determined. For the exchange with that lower value, a portion of the order equal to O may be assigned so that the expectation of filling the pending orders plus the addition of O to the exchanges are equal. Assuming exchange 1 has the lower value, O may be determined by $$O = V1 * \left(\frac{(X2 - Y2)}{V2}\right) - (X1 - Y1).$$

In some implementations, if the value of O is greater than the size of the order, then the entire order may be placed in that exchange. In some implementations, if the value of O is less than the amount of the order, the remaining portion of the order may be distributed among the exchanges according to the expected rate of order fulfillment at each exchange. For example, each exchange may have an amount placed according to $$PX = (T - O) * \left(\frac{VX}{V1 + V2}\right)$$

where T is the size of the order, PX is the portion in exchange X, and VX is the rate of order fulfillment in exchange X. As described below, in some implementations, this may result in fractional numbers, so some embodiments may include rounding to whole numbers and/or lots to facilitate transmission of orders to some exchanges.

It should be recognized that the above example determination is a non-limiting example implementation only. Other embodiments may include any other method of determining a distribution. Other embodiments may not include all the elements of the determination of the distribution (e.g., may or may not round, may or may not perform an initial determination based on the pending orders, and so on).

As mention above, and described below, some embodiments of method 200 may determine new distributions as the amount of orders pending on an exchange change and/or other circumstances related to one or more exchange change. Such embodiments may use a same or different algorithm as described above to determine a distribution.

For a second example of determining a distribution, two exchanges may use a pro-rata method of fulfilling orders. An expected trade volume on a first exchange may be V1 and an expected trade volume on a second exchange may be V2. Accordingly, an expected probability that the next trade will occur on the first exchange may be V1/(V1+V2), and the expected probability that the next trade will occur on the second exchange may be V2/(V1+V2). In one implementation, the first exchange has orders pending on the same side of the order that have a total size X1 and the second exchange has orders pending on the same side of the order that have a total size of X2. In this example, neither side has orders pending on the opposite side of the order. Some embodiments may determine a distribution so that the expected amount of the order fulfilled by the next trade may be greater than if the order were placed fully on only one exchange.

In one implementation, the order may have a total size equal to T. If the next trade on either exchange has a total size of N, then an expected portion fulfilled for the first exchange may be N*[P1/(X1+P1)] if N<=(X1+P1) and P1 if N>(X1+P1), where P1 is the portion of the order distributed to the first exchange.

In other implementations, a determination may be made regarding the size of N relative to X1+P1 and different strategies for determining the distribution may be used depending on the comparison. In some implementations, a determination of a distribution may assume that N<=X1+P1. Some implementations may not know what the size of the next trade will be. The expected total amount allocated from the next trade with size N may be determined by {[V1/(V1+V2)]*N*[P1/(X1+P1)]}+{[V2/(V1+V2)]*N*[P2/(X2+P2)]} when N<=X1+P1. Some embodiments may determine a distribution based, at least in part on the expected size of an order that is expected to be received by at least one exchange (i.e., N).

In some implementations, a determination of a distribution may be determined by maximizing the expected distribution for the next trade. For example, in the implementation described above, a maximum expected allocation may be determined by N/(V1+V2)*MAX(P1){[V1*P1/(S1+P1)]+V2*[(T−P1)/(S2+T−P1)]. In some implementations, the choice of P1 to maximize this equation may be independent of N (in some implementations this may be subject to the assumption that N<=X1+P1). Various method of maximizing this value will be readily understood in the art. For example, various mathematical programs, functions, and/or estimates may be used to determine a maximum value of P1.

In some embodiments, if N is expected to be large (e.g., larger than X1+P1), a distribution may be differently determined than if N is expected to be small. To determine the size of N, a distribution of trade sizes on the one or more exchanges may be analyzed. Such information may be obtained, for example, in block 205. For example, an average size of a trade on an exchange may be used to estimate the next size of the trade N. If the size of the trade is expected to be large, then, for example, a distribution may increase an amount distributed to the exchange that is expected to receive the large trade.

As mentioned above, a determination of a distribution may include fractional numbers or odd lots that may not be acceptable to some exchanges (e.g., some exchanges may only accept whole numbered orders and/or orders with a multiple of 10, 100, etc.). Accordingly, some implementations may round portions of the order in a determined distribution so that they may be acceptable to such exchanges. Such rounding may be performed to maintain an increase in speed or chance of fulfillment. For example, if a distribution determines that a portion with a quantity of 1.1 should be placed in a first exchange and a portion with a quantity of 2.9 should be placed in a second exchange, and both exchanges only accept whole number valued orders, a determination may be made as to whether the expected speed of the orders placed in a 1-3 ratio would be faster or slower than a placement of the orders in a 2-2 ratio and the faster of the two may be selected as the distribution. It should be recognized that any method of determining a rounded order value may be used and that the given example is only a non-limiting example implementation.

It should be recognized that the above examples includes two exchanges that use pro-rata fulfilling methods and that other embodiments may include any number of exchanges with any methods used for fulfilling orders, including a mixed set of FIFO and pro-rate with or without business logic elements.

For example, in an implementation in which an exchange uses a business logic element to give very large orders preference to very small orders, a distribution may be determined to avoid placing very small orders in the exchange if a very large order is already pending in the exchange. As another example, if many small orders are pending in an exchange, a distribution may be determined to place a very large order in the exchange that will be fulfilled before the small orders. Such a determination may be made, for example, by performing a determination as described above with X1 and/or X2 set to 0 if only very small orders are pending. If the result of the calculation would place a large enough portion in the exchange so that the business logic of the exchange would fill the order before the very small orders, then the distribution may be determined to include that larger portion. If the portion determined in such a way is not large enough, then the distribution may be calculated with X1 and X2 set to their actual values. Some implementations may determine a distribution based at least in part on a chance that an order pending on one of the exchanges may not be fulfilled by a matching order because a quantity associated with the order is small. Other business logic elements may have other affects on the distribution.

In some implementations, one or more of the exchanges may use a FIFO fulfillment method. In such a method, if an order is changed, a priority for the order may be decreased, so making distribution changes after an initial order is placed may in some circumstances result in a slower fulfillment rate. Accordingly, in such implementations, an initial distribution to the FIFO exchange may be determined and such a distribution may not be changed or may not be changed as frequently as a distribution among pro-rata exchanges might be. For example, in an implementation with 3 exchanges in which 2 use a pro rata fulfillment method and 1 uses a FIFO fulfillment method, an initial distribution may be determined for the 3 exchanges and updated distributions may be determined for the two pro rata exchanges. The portion determined to be placed on the FIFO exchange may not be changed. The portion may not be changed unless a threshold time passes, unless the order reaches a level of priority, unless a number of other orders are placed on the FIFO exchange after the order, unless the orders in the pro-rata exchanges are fulfilled to a threshold level, and/or unless some other circumstances occur. It should be recognized that a FIFO exchange may be dealt with in many ways and that the previous implementations are given as non-limiting examples only.

In some implementations, an exchange may operate using a hybrid of a pro-rata and a FIFO fulfillment method. In some implementations, a distribution may be determined according to one or more examples above or any other ways to account for the various hybrid methods that may be performed by the exchange.

As indicated at block 209, method 200 may include transmitting orders for trades to at least one of the plurality of exchanges based on the determined distribution. Transmitting such information may include transmitting information related to an order that fulfills a determined portion of the order (i.e., from block 201) to one or more of the plurality of exchanges over a communication network. Such transmission may be made using the FIX protocol, for example. Such transmission may be made directly to the exchanges and/or to one or more intermediaries.

In some embodiments, method 200 may end at block 211, as indicated in FIG. 2 by a solid line. In other embodiment, method 200 may loop to block 205 as indicated by a dashed line. At block 205, information about orders pending on one or more of the plurality of exchanges may be received. In some implementations, for example, an indication of a change to a sum of quantities associated with orders pending on at least one exchange of the plurality of exchanges may be received. Received indications, for example, may indicate that some or all of one or more orders have been fulfilled, other orders have been fulfilled, new orders have been placed, orders have been removed, and so on. Method 200 may then continue to block 207 again and a new distribution may be determined. Method 200 may continue to block 209 and a new set of orders may be placed according to that new distribution. Method 200 may continue looping in such a fashion until, for example, the order has been fulfilled, only a small amount of the order remains unfulfilled (e.g., some percentage, some absolute number, some amount relative to the liquidity of the financial instrument, etc.), and so on. In some embodiments, method 200 may also or instead receive information about a change to a method an exchange uses to fulfill orders, a change to a rate of order fulfillment, and/or a change to any other situation. Such information may be used to determine a new distribution.

It should be recognized that method 200 is given as an example only, and that other embodiments may include other methods. It should be recognized that the present application discloses some example embodiments that are non-limiting to the scope of the claims and that other embodiments not described herein are also contemplated.

Figure 3:
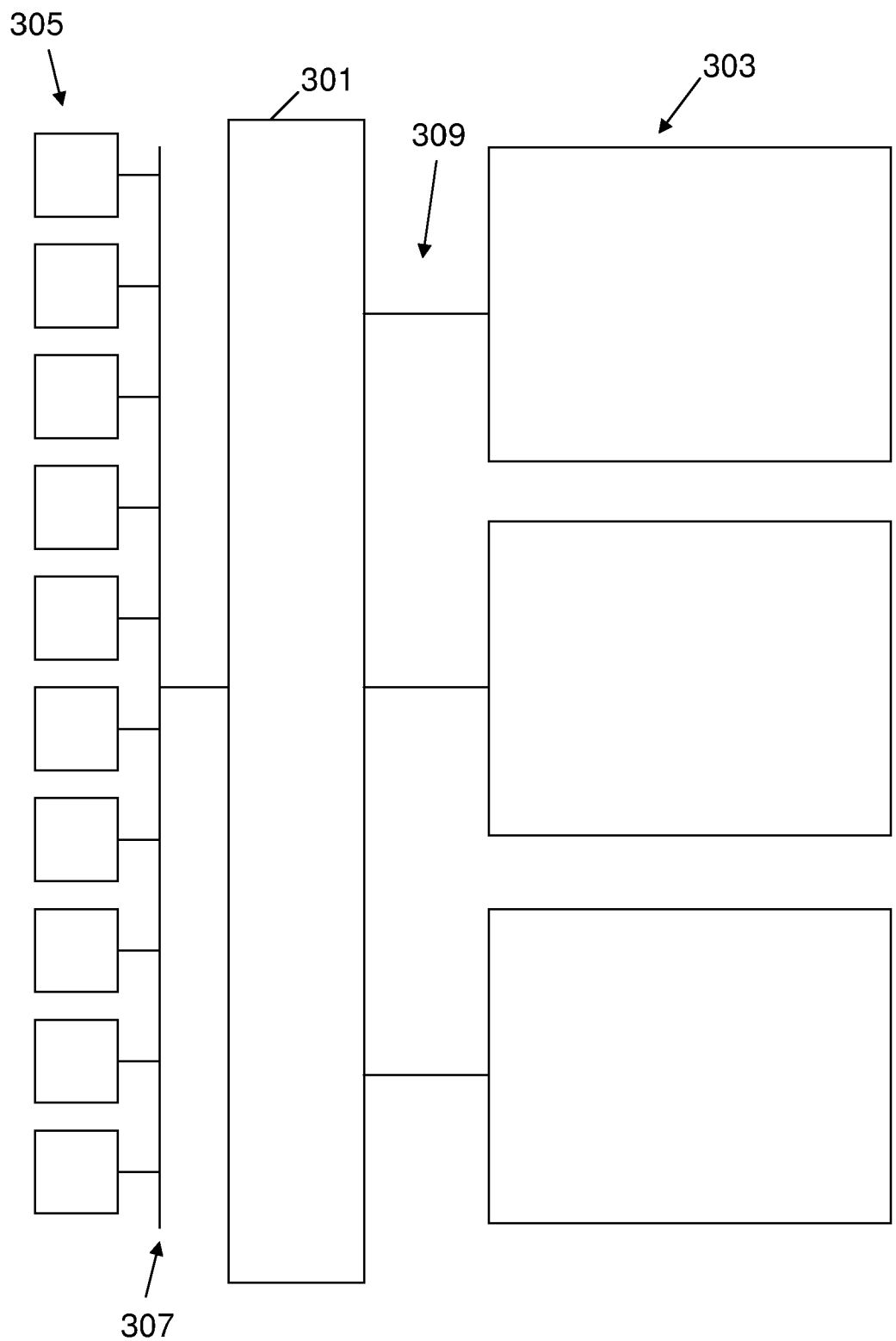
FIG. 3 illustrates an example system for determining distributions.

FIG. 3 illustrates an example of a system 301 that may perform a method similar to method 200. System 301 may include one or more computer systems, processors, blades, and/or any other devices. System 301 may be coupled to a plurality of exchanges 303 that may include one or more computer systems. System 301 may be coupled to a plurality of order sources 305 that may include, for example, a broker, a computer system, a trader or other person, a telephone, and/or any other source of order information. System 301 may be coupled to the plurality of order sources 305 through one or more communication networks 307. System 301 may be coupled to exchanges 303 through one or more communication networks 309. Communication networks 307 and 309 may be the same or different communication networks (e.g., private networks, the Internet, etc.).

It should be recognized that FIG. 3 illustrates an example configuration only and that other embodiments may include any other configuration.

In one example implementation, an intermediary may be connected to three exchanges. The intermediary may receive information identifying that the first exchange uses a hybrid pro-rata and FIFO fulfillment method in which orders that have been pending for longer than an hour are given preference over orders that have not been pending for that time period but that orders within the one hour time period are fulfilled in a pro-rata fashion, that the second exchange uses a pro-rata fulfillment method that favors orders over 10 before orders under 10, and that the third exchange uses a FIFO fulfillment method.

In this example, the intermediary may receive an indication of an order to buy 100 shares of a stock. The intermediary may receive an indication that 2 orders are pending on the first exchange, one order for 10 shares has been pending for 5 minutes and one order for 20 shares has been pending for 2 hours. The intermediary may receive an indication that 2 orders are pending in the second exchange, one order for 20 shares and one order for 5 shares. The intermediary may receive an indication that one order is pending in the third exchange for 10 shares.

In this example, the intermediary may receive an indication that the expected fulfillment rate of the first exchange is 10 shares per time period, that in the second exchange the expected fulfillment rate is 10 shares per time period as well, and in the third exchange the expected fulfillment rate is 20 shares per time period. The intermediary may also receive indications that the size of the expected orders incoming on the exchanges is expected to be relatively small compared to the size of orders on the exchanges now pending and expected to be placed on the exchanges related to the order for 100 shares.

The intermediary may determine an initial distribution of orders among the exchanges taking into account the pending orders, the market fulfillment strategies, and/or order fulfillment rates to improve an expected speed of fulfillment.

In determining an initial distribution, exchange 1 may be determined to not receive any portion unless the expected incoming next order for exchange 1 is greater than 20 shares because otherwise no portion of the order may be used to fulfill the order. For exchange 2, no portion of the order may be placed on exchange 2 unless the expected next order is greater than 10 because otherwise no portion of the order may be filled.

In one example the expected next order is 25 for exchange 1 and 25 for exchange 2 and 50 for exchange 3. In one implementation, the initial determined distribution may indicate, for example, that an order for 10 shares should be placed in the first exchange, an order for 20 shares should be placed in the second exchange and an order for 70 shares should be placed in the third exchange. Such a determination may, for example, take into account that no order fulfillment may take place in the first exchange until the order for 20 shares that has been pending for more than one hour is fulfilled and that similarly no order fulfillment may take place in the third exchange until the pending order for 10 is fulfilled, but that order fulfillment may take place in the second exchange if an order is placed that is greater than 10 before the order that s for only 5 shares. An example calculation may be as follows: $X1/V1=X3+O3/V3$; $X1=30$, $V1=10$, $X3=10$, $V3=20$; so $O3=50$; $X1/V1=X2+O2/V2$; $X2=20$ if we expect the portion assigned to exchange 2 to be 10 or 25 if we expect it to be less than 10; $V2=10$; so $O2=10$, meeting the requirement that the portion equal at least 10. P1 may then equal $(100-O2-O3)*[V1/(V1+V2+V3)]=10$, P2 may then equal $(100-O2-O3)*[V2/(V1+V2+V3)]+O2=20$, and P3 may then equal $(100-O2-O3)*[V3/(V1+V2+V3)]+O3=70$.

If a change occurs in the pending orders of one or more of the exchange, the distribution may be adjusted. For example, if the order for 20 pending on the first exchange is fulfilled and no new orders are placed on the third exchange, the distribution may be adjust to 25 in the first exchange, 15 in the second exchange and 60 in the third exchange. If, however, an order had been placed in the third exchange so that a change to the order pending in the third exchange might result in a loss of priority in the third exchange, a change to the distribution, in some implementations, would instead not make a change to the third exchange but still might make a change to the other two exchanges, resulting a distribution of 20, 10, 70. In some implementations, a decision about whether to make a change to the third exchange may be made based on the size of the new order in the third exchange, a size of a change to the distribution on the third exchange, an expectation of a size of an order that will be placed next on the third exchange, and/or any other criteria that might affect the speed of fulfilling orders on the third exchange.

It should be recognized that this specific example is given as a non-limiting illustration only. Other embodiments may include any number of exchanges using any fulfillment methods, may include any method of determining distributions, any sizes of orders, may make any or no assumptions, and/or any other elements and/or actions.

XII. Other Embodiments

The following should be interested as embodiments, not as claims.

A. A method comprising:
  receiving an indication of a first order, in which the first order includes an instrument to be traded, a quantity of the instrument to be traded, and a side of a trade for the instrument;
  receiving an indication of a rate at which orders for the side of the trade for the financial instrument are expected to be fulfilled by at least one first exchange of a plurality of exchanges;
  receiving an indication of at least one quantity, in which each quantity of the at least one quantity includes sum of quantities associated with second orders pending on at least one second exchange of the plurality of exchanges, in which the second orders include the instrument and the side of trades for the instrument;
  receiving an indication of a method used by at least one third exchange of the plurality of exchanges to fulfill orders pending on the exchange when matching orders received by the exchange;
  based at least in part on the rate, the at least one quantity, and the method, determining an distribution for the first order among the plurality of exchanges; and
  facilitating execution of the order on the plurality of exchanges according to the distribution.

A.1. The method of claim A, in which the first exchange, second exchange, and third exchange are the same exchange.

A.2. The method of claim A, in which facilitating execution includes placing a plurality of orders, in which each of the plurality of orders is placed on one of the plurality of exchanges in accordance with the second distribution.

A.3. The method of claim A, in which at least one of the plurality of exchanges fulfills orders in at least a partially pro-rata fashion.

A.3.1. The method of claim A.3, in which the at least one of the plurality of exchanges fulfills orders in a hybrid pro-rata and FIFO fashion.

A.3.2. The method of claim A.3, in which at least one other of the plurality of exchanges fulfills orders in a FIFO fashion.

A.3.3. The method of claim A.3, in which the at least one of the plurality of exchanges fulfills orders in a pro-rata fashion that includes business logic elements.

A.4. The method of claim A, in which determining the distribution includes determining the distribution based at least in part on an expected size of a third order expected to be received by at least one of the plurality of exchanges, in which the third order includes the instrument and the opposite side of a trade for the instrument.

A.5. The method of claim A, in which the indication of the method of fulfilling orders includes at least one of an indication of a history of orders fulfilled on the at least one exchange, and a description of the method of fulfilling orders.

A.6. The method of claim A, in which the indication of the rate includes a history of orders fulfilled on the at least one exchange.

A.7. The method of claim A, in which determining the distribution includes determining the distribution based at least in part on a chance that at least one second order pending on the at least one of the plurality of exchanges will not be fulfilled by a third order received by the at least one of the plurality of exchanges because a quantity associated with the at least one second order is small.

A.8. The method of claim A, in which at least one of the plurality of exchanges includes a computer system configured to receive indications of orders, determine if any of the indicated orders match, and facilitate execution of at least some of the matching orders.

A.9. The method of claim A, in which the distribution includes a determination of a portion of the quantity associated with the first order to be placed as an order on each of the plurality of exchanges.

A.10. At least one machine readable medium having stored thereon a plurality of instructions configured to cause a processor to perform the method of claim A.

A.11. An apparatus comprising:
one or more processors;
one or more machine readable medium having stored thereon a plurality of instructions that when executed by the one or more processors cause the one or more processors to perform the method of claim A.

A.12. A method comprising: submitting an order to the apparatus of claim A.11.

B. A method comprising:
determining a first distribution for a first order among a plurality of exchanges, in which the first order includes an instrument to be traded, a quantity of the instrument to be traded, and a side of trades for the instrument;
receiving an indication of a change to a sum of quantities associated with second orders pending on at least one exchange of the plurality of exchanges, in which the second orders include the instrument and the side of trades for the instrument, and
determining a second distribution for the first order among the plurality of exchanges based at least in part on the indication; and
facilitating execution of the order through at least one of the plurality of exchanges based on the second distribution.

B.1. The method of claim B, in which the indication of the change of the sum of quantities associated with the second orders includes an indication of an execution of a trade that fulfills at least a portion of at least one of the second orders.

B.1.1. The method of claim B.1, in which the indication of the change includes an indication of an execution of a trade that fulfills at least a portion of the first order.

B.2. The method of claim B, in which facilitating execution includes placing a plurality of orders, in which each of the plurality of orders is placed on one of the plurality of exchanges in accordance with the second distribution.

B.3. The method of claim B, in which at least one of the plurality of exchanges fulfills orders in at least a partially pro-rata fashion.

B.3.1. The method of claim B.3, in which the at least one of the plurality of exchanges fulfills orders in a hybrid pro-rata and FIFO fashion.

B.3.2. The method of claim B.3, in which at least one other of the plurality of exchanges fulfills orders in a FIFO fashion.

B.3.3. The method of claim B.3, in which the at least one of the plurality of exchanges fulfills orders in a pro-rata fashion that includes business logic elements.

B.4. The method of claim B, in which determining the second distribution includes determining the second distribution based at least in part on an expected size of a third order expected to be received by at least one of the plurality of exchanges, in which the third order includes the instrument and the opposite side of a trade for the instrument.

B.5. The method of claim B, in which determining the second distribution includes determining the second distribution based on an expected rate of order fulfillment of at least one of the plurality of exchanges.

B.5.1. The method of claim B.5, further comprising receiving an indication of the at least one rate.

B.5.1.1. The method of claim B.5.1, further comprising:
receiving an indication of a change to the at least one rate; and
determining a third distribution for the first order among the plurality of exchanges based at least in part on the change to the at least one rate; and
facilitating execution of the order through at least one of the plurality of exchanges based on the third distribution.

B.6. The method of claim B, in which determining the second distribution includes determining the second distribution based on a method of fulfilling orders performed by at least one of the plurality of exchanges.

B.6.1. The method of claim B.6, further comprising receiving an indication of the method of fulfilling orders.

B.6.1.1. The method of claim B.6.1, in which the indication of the method of fulfilling orders includes at least one of an indication of a history of orders fulfilled on the at least one exchange, and a description of the method of fulfilling orders.

B.7. The method of claim B, in which determining the second distribution includes determining the second distribution based at least in part on a chance that at least one second order pending on the at least one of the plurality of exchanges will not be fulfilled by a third order received by the at least one of the plurality of exchanges because a quantity associated with the at least one second order is small.

B.8. The method of claim B, in which the at least one of the plurality of exchanges includes a computer system configured to receive indications of orders, determine if any of the indicated orders match, and facilitate execution of at least some of the matching orders.

B.9. The method of claim B, in which the distribution includes a determination of a portion of the quantity associated with the first order to be placed as an order on each of the plurality of exchanges.

B.10. At least one machine readable medium having stored thereon a plurality of instructions configured to cause a processor to perform the method of claim B.

B.11. An apparatus comprising:
one or more processors;
one or more machine readable medium having stored thereon a plurality of instructions that when executed by the one or more processors cause the one or more processors to perform the method of claim B.

B.12. A method comprising: submitting an order to the apparatus of claim B.11.

What is claimed is:

1. A method comprising:
   receiving, by a computing device from a trading system, a computer message identifying a first order, in which the first order includes an instrument to be traded, a quantity of the instrument to be traded, and a side of a trade for the instrument;
   receiving, by the computing device, an indication of a rate at which orders for the side of the trade for the financial instrument are expected to be fulfilled by at least one first exchange of a plurality of exchanges;
   receiving, by the computing device, an indication of at least one quantity, in which each quantity of the at least one quantity includes a total of quantities associated with at least one respective second order pending on at least one second exchange of the plurality of exchanges, in which the second orders include the instrument and the side of trades for the instrument;
   receiving, by the computing device, an indication of a method used by at least one third exchange of the plurality of exchanges to fulfill orders pending on the exchange when matching orders received by the third exchange;
   based at least in part on the rate, the at least one quantity, and the method, computing, by the computing device, a distribution of sub-parts of the first order among the plurality of exchanges; and
   attempting, by the computing device, to facilitate execution of the first order on the plurality of exchanges according to the distribution of sub-parts to the plurality of exchanges.

2. The method of claim 1, in which the first exchange, second exchange, and third exchange are the same exchange.

3. The method of claim 1, in which attempting to facilitate execution includes placing a plurality of orders, in which each of the plurality of orders identifies a respective sub part, in which each of the plurality of orders is placed on one of the plurality of exchanges in accordance with the distribution.

4. The method of claim 1, in which at least one of the plurality of exchanges fulfills orders in at least a partially pro-rata fashion.

5. The method of claim 4, in which the at least one of the plurality of exchanges fulfills orders in a hybrid pro-rata and FIFO fashion.

6. The method of claim 4, in which at least one other of the plurality of exchanges fulfills orders in a FIFO fashion.

7. The method of claim 4, in which the at least one of the plurality of exchanges fulfills orders in a pro-rata fashion that includes business logic elements.

8. The method of claim 1, in which determining the distribution includes determining the distribution based at least in part on an expected size of a third order expected to be received by at least one of the plurality of exchanges, in which the third order includes the instrument and the opposite side of a trade for the instrument.

9. The method of claim 1, in which the indication of the method of fulfilling orders includes at least one of an indication of a history of orders fulfilled on the at least one exchange, and a description of the method of fulfilling orders.

10. The method of claim 1, in which the indication of the rate includes a history of orders fulfilled on the at least one exchange.

11. The method of claim 1, in which determining the distribution includes determining the distribution based at least in part on a chance that at least one second order pending on the at least one of the plurality of exchanges will not be fulfilled by a third order received by the at least one of the plurality of exchanges because a quantity associated with the at least one second order is small.

12. The method of claim 1, in which at least one of the plurality of exchanges includes a computer system configured to receive indications of orders, determine if any of the indicated orders match, and facilitate execution of at least some of the matching orders.

13. The method of claim 1, in which the distribution includes an allocation of a respective portion of the quantity associated with the first order to be placed as an order on each of the plurality of exchanges.

14. The method of claim 3, in which each order of the plurality of orders is an order for a portion of the quantity of the instrument, and in which a sum of the portions equals the quantity.

15. The method of claim 4, in which determining the distribution includes determining the distribution based on the at least partially pro-rata fashion.

16. The method of claim 6, in which determining the distribution includes determining an expected rate of order fulfillment through the at least one of the plurality of exchange, determining an expected rate of order fulfillment through the at least one other of the plurality of exchanges and determining the distribution to increase an expected overall rate of order fulfillment using both of the exchanges.

17. The method of claim 8, in which the expectation of the size is based on a history of orders received by the at least one of the plurality of exchanges.

18. The method of claim 1, in which determining the distribution includes determining a distribution that has an increase in expected speed of fulfillment compared to an expected speed of fulfillment of submitting the first order to a single exchange of the plurality of exchanges.

19. The method of claim 1, further comprising:
   receiving an indication of a change to the rate;
   determining a third distribution for the first order among the plurality of exchanges based at least in part on the change to the rate; and
   attempting to facilitate execution of the first order through at least one of the plurality of exchanges based on the third distribution.

20. The method of claim 1, further comprising:
   receiving an indication of a change to the at least one quantity,
   determining a second distribution for the first order among the plurality of exchanges based at least in part on the change to the at least one quantity; and
   in response to determining the second distribution, attempting to facilitate execution of the first order through at least one of the plurality of exchanges based on the second distribution instead of the distribution.

21. The method of claim 20, in which the indication of the change to the at least one quantity includes an indication of an execution of a trade that fulfills at least a portion of at least one of the second orders.

22. The method of claim 21, in which the indication of the change includes an indication of an execution of a trade that fulfills at least a portion of the first order.

23. The method of claim 22, in which the second distribution includes an allocation of a respective portion of the unfulfilled quantity to be placed as an order on each of the plurality of exchanges.

24. The method of claim 22, in which attempting to facilitate execution includes placing a plurality of orders, in which each of the plurality of orders is placed on one of the plurality of exchanges in accordance with the second distribution, in which each order of the plurality of orders is an order for a portion of the unfulfilled quantity of the instrument, and in which a sum of the portions equals the unfulfilled quantity.

25. The method of claim 20, in which attempting to facilitate execution includes placing a plurality of orders, in which each of the plurality of orders is placed on one of the plurality of exchanges in accordance with the second distribution.

26. The method of claim 20, in which the method includes cancelling a plurality of orders previously submitted to the plurality of exchanges in an attempt to facilitate the fulfillment of the first order based on the distribution.

27. The method of claim 20, further comprising:
receiving an indication of a change to the rate;
determining a third distribution for the first order among the plurality of exchanges based at least in part on the change to the rate; and
attempting to facilitate execution of the first order through at least one of the plurality of exchanges based on the third distribution.

28. An apparatus comprising:
a computing device, and
a non-transitory machine readable medium having stored thereon a plurality of instructions that when executed by the computing device cause the computing device to perform a method comprising:
receiving an indication of a first order, in which the first order includes an instrument to be traded, a quantity of the instrument to be traded, and a side of a trade for the instrument;
receiving an indication of a rate at which orders for the side of the trade for the financial instrument are expected to be fulfilled by at least one exchange of a plurality of exchanges, in which the indication of the rate includes a history of orders fulfilled on the at least one exchange;
receiving an indication of at least one quantity, in which each quantity of the at least one quantity includes a total of quantities associated with at least one respective second order pending on the at least one exchange of the plurality of exchanges, in which the second orders include the instrument and the side of trades for the instrument;
receiving an indication of a method used by the at least one exchange of the plurality of exchanges to fulfill orders pending on the exchange when matching orders received by the at least one exchange, in which the indication of the method of fulfilling orders includes at least one of an indication of a history of orders fulfilled on the at least one exchange, and a description of the method of fulfilling orders;
based at least in part on the rate, the at least one quantity, and the method, determining an distribution for the first order among the plurality of exchanges, in which the distribution includes an allocation of a respective portion of the quantity associated with the first order to be placed as an order on each of the plurality of exchanges;
in which determining the distribution includes determining the distribution based at least in part on an expected size of a third order expected to be received by at least one of the plurality of exchanges, in which the third order includes the instrument and the opposite side of a trade for the instrument, in which the expectation of the size is based on a history of orders received by the at least one of the plurality of exchanges;
in which determining the distribution includes determining the distribution based at least in part on a chance that at least one second order pending on the at least one of the plurality of exchanges will not be fulfilled by a third order received by the at least one of the plurality of exchanges because a quantity associated with the at least one second order is small;
in which at least one of the plurality of exchanges fulfills orders in at least a partially pro-rata fashion, in which the at least one of the plurality of exchanges fulfills orders in a hybrid pro-rata and FIFO fashion, in which at least one other of the plurality of exchanges fulfills orders in a FIFO fashion, in which the at least one of the plurality of exchanges fulfills orders in a pro-rata fashion that includes business logic elements, in which at least one of the plurality of exchanges includes a computer system configured to receive indications of orders, determine if any of the indicated orders match, and facilitate execution of at least some of the matching orders;
in which determining the distribution includes determining the distribution based on the at least partially pro-rata fashion, in which determining the distribution includes determining an expected rate of order fulfillment through the at least one of the plurality of exchange, determining an expected rate of order fulfillment through the at least one other of the plurality of exchanges and determining the distribution to increase an expected overall rate of order fulfillment using both of the exchanges;
in which determining the distribution includes determining a distribution that has an increase in expected speed of fulfillment compared to an expected speed of fulfillment of submitting the first order to a single exchange of the plurality of exchanges;
attempting to facilitate execution of the first order on the plurality of exchanges according to the distribution, in which attempting to facilitate execution includes placing a plurality of orders, in which each of the plurality of orders is placed on one of the plurality of exchanges in accordance with the distribution, in which each order of the plurality of orders is an order for a portion of the quantity of the instrument, and in which a sum of the portions equals the quantity;
receiving an indication of a change to the at least one quantity, in which the indication of the change to the at least one quantity includes an indication of an execution of a trade that fulfills at least a portion of at least one of the second orders, in which the indication of the change includes an indication of an execution of a trade that fulfills at least a portion of the first order;
determining a second distribution for the first order among the plurality of exchanges based at least in part on the change to the at least one quantity, in which the second distribution includes an allocation of a respective portion of the unfulfilled quantity to be placed as an order on each of the plurality of exchanges;

in response to determining the second distribution, attempting to facilitate execution of the first order through at least one of the plurality of exchanges based on the second distribution instead of the distribution, in which attempting to facilitate execution includes placing a plurality of orders, in which each of the plurality of orders is placed on one of the plurality of exchanges in accordance with the second distribution, in which attempting to facilitate execution includes placing a plurality of orders, in which each of the plurality of orders is placed on one of the plurality of exchanges in accordance with the second distribution, in which each order of the plurality of orders is an order for a portion of the unfulfilled quantity of the instrument, and in which a sum of the portions equals the unfulfilled quantity;

cancelling a plurality of orders previously submitted to the plurality of exchanges in an attempt to facilitate the fulfillment of the first order based on the distribution;

receiving an indication of a change to the rate;

determining a third distribution for the first order among the plurality of exchanges based at least in part on the change to the rate; and attempting to facilitate execution of the first order through at least one of the plurality of exchanges based on the third distribution.

* * * * *